25°C

50°C

75°C

INVENTOR
R. L. BEAUCHAMP
ATTORNEY

100°C

116°C

CONCENTRATION OF $Cd(NO_3)_2 \cdot 4H_2O$, MOLARITY

United States Patent Office 3,573,101
Patented Mar. 30, 1971

3,573,101
METHOD FOR PRODUCING A CADMIUM ELECTRODE FOR NICKEL CADMIUM CELLS
Richard L. Beauchamp, Madison, N.J., assignor to Bell Telephone Laboratories, Incorporated, Murray Hill and Berkeley Heights, N.J.
Filed Jan. 7, 1970, Ser. No. 1,134
Int. Cl. H01m 35/30
U.S. Cl. 136—76
7 Claims

ABSTRACT OF THE DISCLOSURE

The electrolytic deposition of cadmium hydroxide in a porous electrode structure is carried out within the critical temperature range of from about 85° C. to the boiling point of the electrolyte, resulting in the formation of high energy density negative electrodes for alkaline nickel cadmium cells in at least half the time previously required. In addition, the electrodes exhibit a high percent utilization of active material subsequently formed from the deposit and resist flaking or shedding of the active material during formation and cell use.

BACKGROUND OF THE INVENTION

Field of the invention

This invention relates to a method for forming a product which is useful as the negative electrode of an alkaline nickel cadmium cell, essentially by the electrolytic deposition of cadmium hydroxide in a porous structure, and to the resultant product, and to cells containing the product.

Prior art

Electrodes for use in energy-supplying alkaline nickel-cadmium electrolytic cells desirably exhibit high energy densities and high percent utilization of active material, in order to contribute to a long and efficient cell life. A commercially established approach to the achievement of these characteristics is the filling of a porous electrode structure with finely divided active material so as to present a high surface area of a substantial amount of material to the electrolyte. In practice, however, difficulty has been experienced in the achievement of adequate loading of the porous structures. In addition, the formation of the negative electrode is rendered more difficult by the fact that it is generally preferred to contain 1.5 to 2 times the amount of active material in the positive electrode.

One widely known and frequently practiced method is that of vacuum impregnation, in which the porous structure is filled under vacuum with an aqueous solution of a cadmium salt, the salt is reduced to the hydroxide by electrolytic treatment with an alkaline solution, and the liquid allowed to evaporate, leaving the hydroxide. The amount of material loaded at one time is, of course, limited by the solubility of the salt in the aqueous solution. Typically, at least four impregnation cycles, requiring four or five days to complete, are required to achieve commercially acceptable loading levels by this method.

A more satisfactory method is described in U.S. Pat. 3,214,355, issued to Ludwig Kandler on Oct. 26, 1965, involving the electrolytic deposition of cadmium hydroxide directly in the pores of the electrode structure as a cathode. This is carried out in an acid electrolyte containing cadmium ions and reducible ions, the redox potential of which is more positive than that of the cadmium ions. During the electrolysis, the reducible ions, for example, nitrate ions, prevent the reduction of the cadmium ions within the cathode structure by themselves being reduced. The resultant consumption of hydrogen ions increases the pH value of the electrolyte within the cathode structure to the extent that slow precipitation of cadmium hydroxide results.

However, when this impregnation process is carried out under normal operating conditions, the maximum loading of the electrode structure obtained is approximately one gram per cubic centimeter of void volume. Increasing the time of impregnation results only in the accumulation of material on the outside surface of the structure. Only after the cadmium hydroxide is reduced to cadmium metal and the electrode is dried can an additional amount of material be introduced into the porous structure. It has been found for one set of conditions that this impregnation process must be repeated three times to obtain a loading of about 1.5 grams per cubic centimeter of void volume, which is suitable to allow its use as a negative electrode in a nickel cadmium cell. Since impregnated electrodes are ordinarily allowed to dry overnight, typically three to four days are required to form one negative electrode by this process.

SUMMARY OF THE INVENTION

It has now been discovered that carrying out the electrolytic deposition of cadmium hydroxide in a porous electrode structure within the critical temperature range of from about 85° C. to the boiling point of the electrolyte, results in significantly increased loading, enabling the formation of commercially acceptable negative electrodes for nickel cadmium cells after only one impregnation, and furthermore results in a finely divided and uniform deposit, leading to improved percent utilization of active material and resistance of the electrode to flaking and shedding of the deposit during formation and cell use.

Such filled structures may subsequently be treated electrolytically with an alkaline solution so as reduce the cadmium hydroxide to a porous active deposit of cadmium metal, prior to their incorporation into alkaline nickel cadmium cells as negative electrodes.

In a preferred embodiment, platinum counter-electrodes are utilized during the cadmium hydroxide deposition, and an alkali metal nitrite is added to the electrolyte solution in order to stabilize the pH of the bulk thereof during impregnation.

DETAILED DESCRIPTION OF THE INVENTION

Figure 1A:
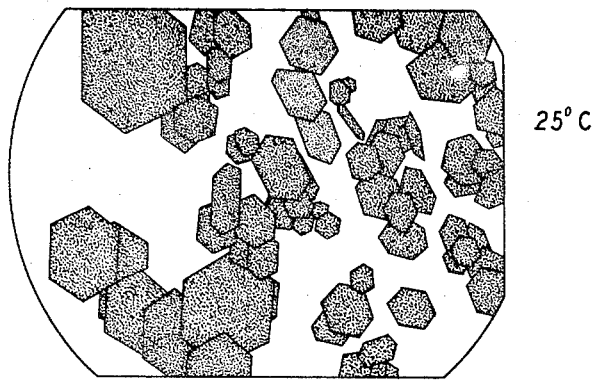
FIG. 1A is a representation of a transmission electron micrograph of cadmium hydroxide, $Cd(OH)_2$, crystals formed at a temperature of 25° C. in a 4 M cadmium nitrate solution.
Figure 1B:
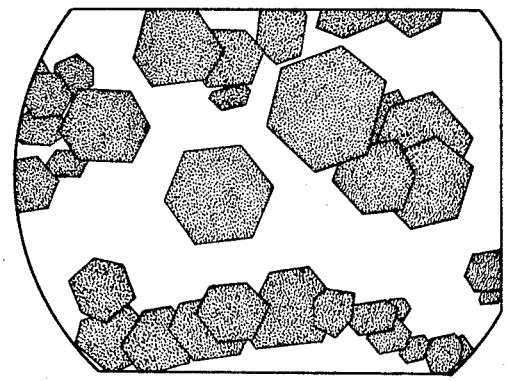
FIG. 1B is a representation of a transmission electron micrograph of cadmium hydroxide, $Cd(OH)_2$, crystals formed at a temperature of 50° C. in a 4 M cadmium nitrate solution.
Figure 1C:
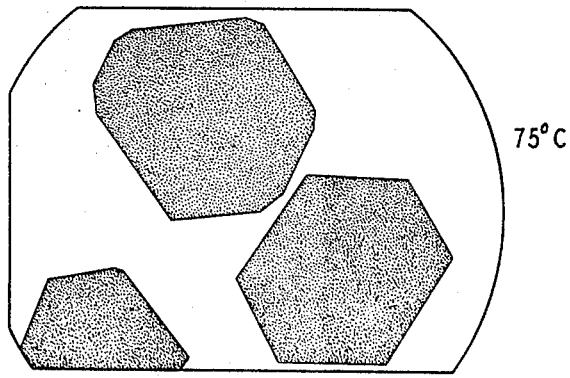
FIG. 1C is a representation of a transmission electron micrograph of cadmium hydroxide, $Cd(OH)_2$, crystals formed at a temperature of 75° C. in a 4 M cadmium nitrate solution.
Figure 1D:
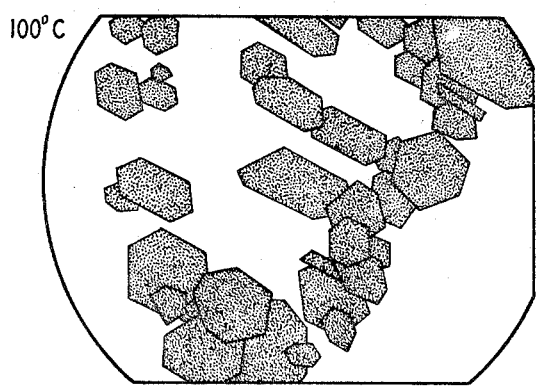
FIG. 1D is a representation of a transmission electron micrograph of cadmium hydroxide, $Cd(OH)_2$, crystals formed at a temperature of 100° C. in a 4 M cadmium nitrate solution.
Figure 1E:
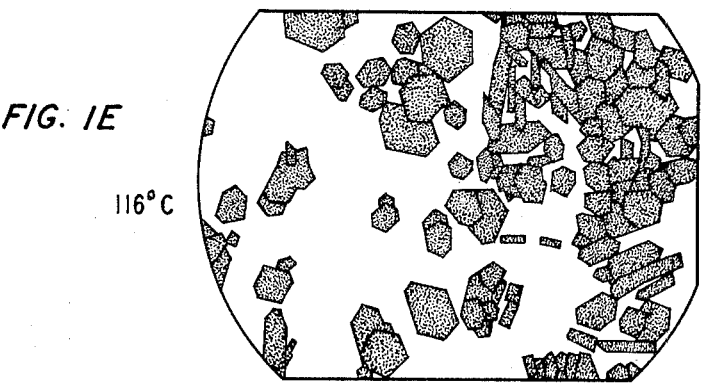
FIG. 1E is a representation of a transmission electron micrograph of cadmium hydroxide, $Cd(OH)_2$, crystals formed at a temperature of 116° C. in a 4 M cadmium nitrate solution.

It is essential to the successful practice of the invention that the deposition of cadmium hydroxide be carried out within the critical temperature range of from about 85° C. to the boiling point of the electrolyte, since only within this temperature range are the cadmium hydroxide crystals precipitated of such a size as to result in an electrode having a highly loaded, uniform and finely divided deposit. Since the size of the crystals tends to decrease with increasing temperature within the critical range, it is preferred for optimum results to operate at a temperature at or near the boiling point of the electrolyte solution.

The ionic species which must be present in the electrolyte solution are cadmium ions and a reducible species, the redox potential of which is more positive than that of cadmium ions such, for example, as chromic acid ions, chlorate ions, permanganate ions, or nitrate ions. Nitrate ions are particularly suitable for this purpose and it has been found convenient to add both ionic species as cadmium nitrate, $Cd(NO_3)_2$, or a hydrated form, such as $Cd(NO_3)_2 \cdot 4H_2O$, although both species need not be present in the same amount.

The time required for the deposition of cadmium hydroxide in the pores of the electrode structure is dependent upon the current density on the surface of the structure as a cathode, and the concentration of the ionic species in the electrolyte solution. Although these parameters are not critical, a suitable electrode being obtainable under a variety of conditions, nevertheless there exist preferred operating conditions. For example, in a practical process it is preferred to keep impregnation time as short as possible and to this end it is preferred to adjust solution concentration and current density accordingly.

Optimum loading conditions correspond to concentrations of each ion within the range of 1.5 to 3.0 M and current densities of 4 to 8 amps per square meter. Exceeding these ranges in either direction results in a decrease in the level of loading for a given amount of charge (amp hour). For these optimum loading conditions, the time of deposition should in general not exceed 30 minutes to an hour, the shorter times corresponding to the higher current densities, beyond which the deposit tends to build up on the surface of the porous structure.

It is stressed, however, that these are preferred ranges, and that adequate loading may be obtained under other conditions of current and concentration where longer impregnation times are tolerable. It is, of course, essential that the concentration of cadmium ions and reducible ions be sufficient so that their rate of replenishment within the pores of the cathode from the bulk of the solution is adequate to prevent the zone of precipitation from moving toward the outside of the porous structure.

Since it is imperative that the impregnation process be carried out at elevated temperatures, the selection of an inert material for use as counterelectrodes may be desirable to avoid the danger of introducing impurities into the negative plate during impregnation. Platinum counterelectrodes are particularly suitable for this purpose. However, if platinum is used, it may be desirable to insure against abrupt and substantial changes in pH of the electrolyte solution during electrolysis. Such may be accomplished by the use of a supporting electrolyte which is compatible with the chemistry of the electrolyte solution and is preferentially oxidized at the platinum anodes during electrolysis. Examples of suitable supporting electrolytes are the alkali nitrites such as sodium or potassium nitrite, in an amount which is sufficient to prevent oxygen evolution at the counter-electrodes throughout the period of impregnation, and may typically range from .1 M to saturation.

It may be necessary, due to the particular combination of operating conditions and electrolyte compositions chosen, to adjust the pH of the electrolyte prior to or during deposition. As is known such may be accomplished simply by the addition of a solution of an acid or base, such as nitric acid or potassium hydroxide.

EXAMPLE I

The effect of temperature on the size of the cadmium hydroxide crystals precipitated during electrolysis was examined as follows. Planar nickel sheet electrodes were cleaned, annealed, and etched for 15 seconds in concentrated nitric acid, washed and dried, to produce a surface suitable for deposition of cadmium hydroxide. Deposition was carried out in a test cell in which each nickel electrode as cathode was placed between two platinum counter-electrodes, at temperatures of 25° C., 50° C., 75° C., 100° C., and 116° C., (the boiling point of the solution) using a 4 molar cadmium nitrate solution at a current density of about 10 amps per square meter for about 15 minutes. The electrodes were then removed from the cell, washed, and dried. Samples of the surface deposits taken from each electrode were transferred onto collodion films for examination by electron microscope. The results are presented as photomicrographs in FIGS. 1A through 1E. It is seen that at lower temperatures (25° C. to 75° C.), cadmium hydroxide is present in the form of hexagonal leaflets, their size increasing with increasing temperature. Above 75° C., however, the appearance of smaller irregular crystallites becomes evident, their size tending to decrease with increasing temperatures.

The following example illustrates some typical loading levels which may be achieved by the inventive process, as well as the influence which concentration and current density may have on the loading levels.

EXAMPLE II

A series of sintered nickel plaques of uniform size and porosity were cleaned and weighed, and a series of electrolyte solutions having concentrations of cadmium nitrate, pH values and boiling temperatures shown in Table 1 were prepared.

TABLE 1

| Concentration in molarity | Average pH | Impregnation (boiling) temperature, degrees C. |
|---|---|---|
| 0.5 | 4.3 | 100 |
| 1.0 | 3.5 | 103 |
| 2.0 | 2.7 | 105 |
| 4.0 | 1.4 | 115 |

Figure 2:
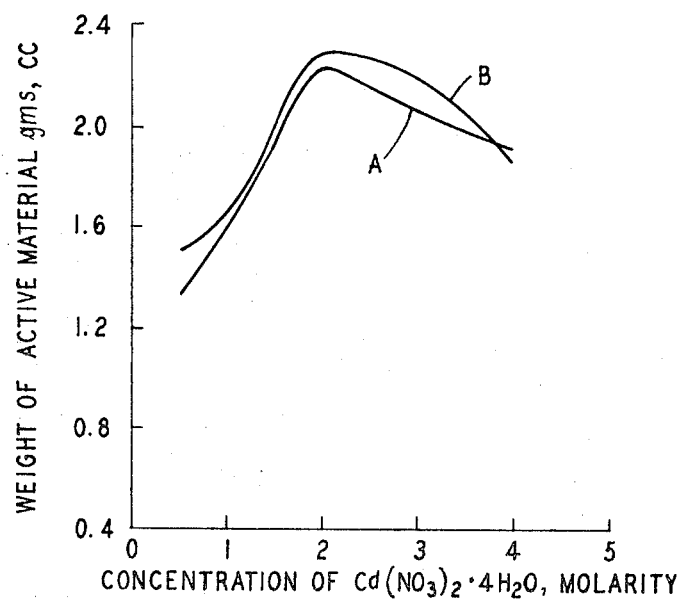
FIG. 2 is a graph of loading level of a porous electrode structure after one impregnation cycle expressed as weight of active material in grams per cubic centimeter of void volume versus concentration of cadmium nitrate in moles, for impregnations carried out at current densities of 4 and 8 amps per square meter, respectively.

Using a test cell similar to that described in Example I, the plaques were presoaked for about five minutes in the boiling electrolyte solutions, impregnated with cadmium hydroxide in accordance with the invention, at current densities of 4 and 8 amps per square meter, for times of one hour and 30 minutes, respectively. Each impregnation was thus carried out using the constant charge of 1 amp hour. Boiling chips were employed to insure free circulation of boiling electrolyte. After impregnation, the plaques were removed from the test cell, washed and dried. They were next treated electrolytically in a 30 percent solution of potassium hydroxide in order to reduce the cadmium hydroxide in the pores to active cadmium metal. The active plaques were then cycled repetitively at charge and discharge rates of C/2 and C/4, respectively. Following this, they were brushed, washed, dried, and weighed again to determine the amount of active material retained. Results are shown in FIG. 2 in which the weight of active material retained in grams per cubic centimeter of void volume is plotted against concentration of cadmium nitrate in moles. Curves A and B correspond to impregnations at 4 and 8 amps per square meter, respectively. It is seen that the curves are of similar shape and show a maximum loading level or weight of active material retained at a concentration of about 2 M of cadmium nitrate, and that at this concentration about 2.2 grams per cubic centimeter of active material was retained for a current density of 4 amps per square meter and about 2.3 grams per cubic centimeter for a current density of about 8 amps per square meter. These results indicate that a commercially acceptable loading level is obtainable after only one impregnation cycle.

The invention has been described in terms of a limited number of embodiments. However, it essentially teaches a method for impregnating a porus conductive structure with cadmium hydroxide. Other embodiments are, therefore, contemplated. For example, while commercially acceptable electrodes are obtainable with only one impregnation, it may be desirable to increase loading even further by the use of two or more impregnation cycles. In addition, since the process is of greatest commercial significance with relation to the production of electrodes for electrolytic cells, it is contemplated that after impregnation the cadmium hydroxide will be reduced to active cadmium metal in accordance with procedures known in the art, such as electrolytic treatment in a solution of potassium hydroxide. In addition to its use as a negative electrode in alkaline nickel-cadmium cells, the product is, of course, also useful in other electrolytic cells, such as mercury-cadmium cells and silver-cadmium cells.

What is claimed is:

1. A method for introducing cadmium hydroxide into a porous electrically conductive structure which comprises electrolyzing, with the porous structure as cathode, an acid electrolyte containing ions of cadmium and reducible ions, the redox potential of which is more positive than the redox potential of the cadmium ions, characterized in that said acid electrolyte is maintained at a temperature of from about 85° C. to its boiling point during electrolysis.

2. The method of claim 1 in which the porous electrically conductive structure is a sintered nickel plaque.

3. The method of claim 1 in which the reducible ions are nitrate ions.

4. The method of claim 3 in which the cadmium ions and nitrate ions are each present in the electrolyte in the amount of from 1.5 to 3 molar, and in which said electrolysis is carried out at a current density of from 4 to 8 amps per square meter.

5. The method of claim 4 in which said electrolysis is carried out for a time of from 30 minutes to one hour, the shorter times corresponding to higher current densities.

6. The method of claim 1 in which said electrolysis is followed by contacting the porous structure with a solution of potassium hydroxide so as to reduce the cadmium hydroxide therein to cadmium metal.

7. The method of claim 1 in which said electrolysis is carried out in an electrolytic cell containing platinum counter-electrodes, and in which said electrolyte additionally contains nitrite ions in the amount of from .1 molar to saturation.

References Cited
UNITED STATES PATENTS

| | | | |
|---|---|---|---|
| 3,184,338 | 5/1965 | Mueller | 136—76 |
| 3,214,355 | 10/1965 | Kandler | 204—56 |
| 3,449,167 | 6/1969 | Keel et al. | 136—76 |

WINSTON A. DOUGLAS, Primary Examiner

CHARLES F. LEFEVOUR, Assistant Examiner

U.S. Cl. X.R.

136—24, 67; 204—56